(12) United States Patent
Ishikawa et al.

(10) Patent No.: US 11,722,624 B2
(45) Date of Patent: Aug. 8, 2023

(54) CONTROL BOARD FOR DRIVING LOAD OF IMAGE FORMING APPARATUS

(71) Applicant: CANON KABUSHIKI KAISHA, Tokyo (JP)

(72) Inventors: Naoki Ishikawa, Chiba (JP); Teruhiko Suzuki, Tokyo (JP); Toshinori Kimura, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 25 days.

(21) Appl. No.: 17/190,527

(22) Filed: Mar. 3, 2021

(65) Prior Publication Data
US 2021/0281709 A1 Sep. 9, 2021

(30) Foreign Application Priority Data

Mar. 6, 2020 (JP) .................. 2020-038700

(51) Int. Cl.
*H04N 1/32* (2006.01)
*G03G 15/00* (2006.01)

(52) U.S. Cl.
CPC ..... *H04N 1/32593* (2013.01); *G03G 15/5037* (2013.01); *H04N 1/32587* (2013.01)

(58) Field of Classification Search
None
See application file for complete search history.

(56) References Cited

U.S. PATENT DOCUMENTS

| 4,523,807 | A | 6/1985 | Suzuki |
| 4,875,810 | A | 10/1989 | Chiba et al. |
| 5,504,847 | A | 4/1996 | Kimura et al. |
| 5,694,330 | A | 12/1997 | Iwamura et al. |
| 6,321,182 | B1 | 11/2001 | Suzuki |
| 7,731,904 | B2 | 6/2010 | Okamoto et al. |
| 8,305,656 | B2 * | 11/2012 | Hayashi ............. H04N 1/32561 358/475 |
| 9,248,445 | B2 | 2/2016 | Okamoto et al. |
| 10,732,560 | B2 * | 8/2020 | Suzuki ................. G03G 15/20 |
| 10,842,019 | B2 * | 11/2020 | Shinotsuka ............ G03G 15/80 |
| 2004/0009002 | A1 * | 1/2004 | Mori .................... G03G 15/80 399/75 |
| 2011/0317501 | A1 * | 12/2011 | Jinbo .................... G11C 5/147 365/189.14 |

(Continued)

OTHER PUBLICATIONS

U.S. Appl. No. 17/189,413, filed Mar. 2, 2021.

*Primary Examiner* — Miya J Williams
*Assistant Examiner* — Pawan Dhingra
(74) *Attorney, Agent, or Firm* — Venable LLP

(57) ABSTRACT

A control board configured to be mountable to a first image forming apparatus and to a second image forming apparatus of a type different from a type of the first image forming apparatus, the first image forming apparatus including a first load, the second image forming apparatus including a second load having a function different from a function of the first load. The control board comprising a connector to which the first load is to be connected in a case where the control board is mounted to the first image forming apparatus, and to which the second load is to be connected in a case where the control board is mounted to the second image forming apparatus, a common drive circuit configured to drive the first load and the second load via the connector, and one or more processors.

9 Claims, 5 Drawing Sheets

(56) References Cited

U.S. PATENT DOCUMENTS

| | | | |
|---|---|---|---|
| 2012/0161678 A1* | 6/2012 | Maiocchi | G11B 21/12 318/150 |
| 2015/0053756 A1* | 2/2015 | Nakayama | G06V 30/2253 235/375 |
| 2017/0351193 A1* | 12/2017 | Ishikawa | G03G 15/04054 |
| 2018/0095704 A1* | 4/2018 | Ueda | G06F 3/1285 |
| 2018/0103542 A1* | 4/2018 | Shinotsuka | G03G 21/1652 |
| 2020/0103805 A1* | 4/2020 | Suzuki | G03G 15/5004 |
| 2020/0240652 A1* | 7/2020 | Asai | F24F 1/24 |

* cited by examiner

CONTROL BOARD FOR DRIVING LOAD OF IMAGE FORMING APPARATUS

BACKGROUND OF THE INVENTION

Field of the Invention

The present disclosure relates to a control board for driving a load of an image forming apparatus.

Description of the Related Art

Various specifications are demanded for image forming apparatus due to the diversification of users. Thus, image forming apparatus having various specifications are being developed. In order to efficiently develop image forming apparatus of various types, standardization of loads used for the apparatus and standardization of control boards for controlling operations of the loads are being promoted. Even in the case of standardization, in order to satisfy specifications of every apparatus, types of loads may be different, or loads may be of the same type but have different operation specifications. In such cases, it is required that the loads be individually designed. In U.S. Pat. No. 8,305,656 B2, there is disclosed a technology of creating drive profiles for every different apparatus to drive motors of the different apparatus with the same board (control board). The development efficiency is improved by creating the drive profiles for every apparatus.

In a case where the loads of the same type are provided but have different functions for every apparatus, it is required that components which are adaptable to the functions of every apparatus be mounted to the control board. In order to standardize the control board for each apparatus, components which are adaptable to the functions of the apparatus are mounted to the control board by the number corresponding to the number of types of the apparatus. Drive signals are transmitted from a central processing unit (CPU) of the control board to the components which are adaptable to the functions of every apparatus. Thus, terminals of the CPU are required by the number corresponding to the number of components. Further, connectors for connecting the control board and the loads to each other are provided so as to be adaptable to each apparatus. Thus, the control board is increased in size. The present disclosure has been made in view of the problems described above to achieve a control board which is capable of driving loads having different functions for every apparatus without an increase in size in a case where a control board which is common to image forming apparatus of different types is used.

SUMMARY OF THE INVENTION

A control board according to the present disclosure is configured to be mountable to a first image forming apparatus and to a second image forming apparatus of a type different from a type of the first image forming apparatus, the first image forming apparatus including a first load, the second image forming apparatus including a second load having a function different from a function of the first load, the control board comprising: a connector to which the first load is to be connected in a case where the control board is mounted to the first image forming apparatus, and to which the second load is to be connected in a case where the control board is mounted to the second image forming apparatus; a common drive circuit configured to drive the first load via the connector in a case where the control board is mounted to the first image forming apparatus, and configured to drive the second load via the connector in a case where the control board is mounted to the second image forming apparatus; and a processor configured to: set a first control parameter for driving the first load to allow the common drive circuit to drive the first load based on the first control parameter in a case where the control board is mounted to the first image forming apparatus; and set a second control parameter for driving the second load to allow the common drive circuit to drive the second load based on the second control parameter in a case where the control board is mounted to the second image forming apparatus.

Further features of the present invention will become apparent from the following description of exemplary embodiments (with reference to the attached drawings).

DESCRIPTION OF THE EMBODIMENTS

Now, description is given of an embodiment of the present disclosure with reference to the drawings. However, the following embodiment is not to limit the invention laid down in the scope of patent claims, and not all of combinations of features described in the embodiment are indispensable to the solving means of the present disclosure.

<Image Forming Apparatus>

Figure 1:
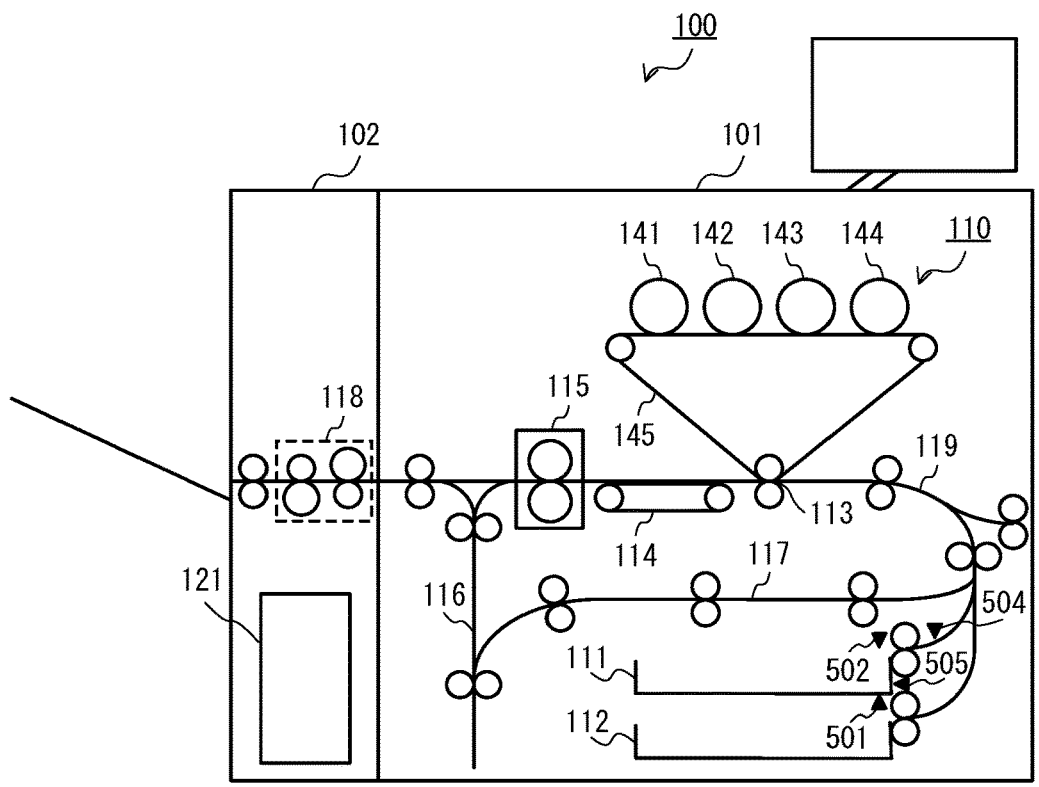
FIG. 1 is a configuration view of a first image forming apparatus.
Figure 2:
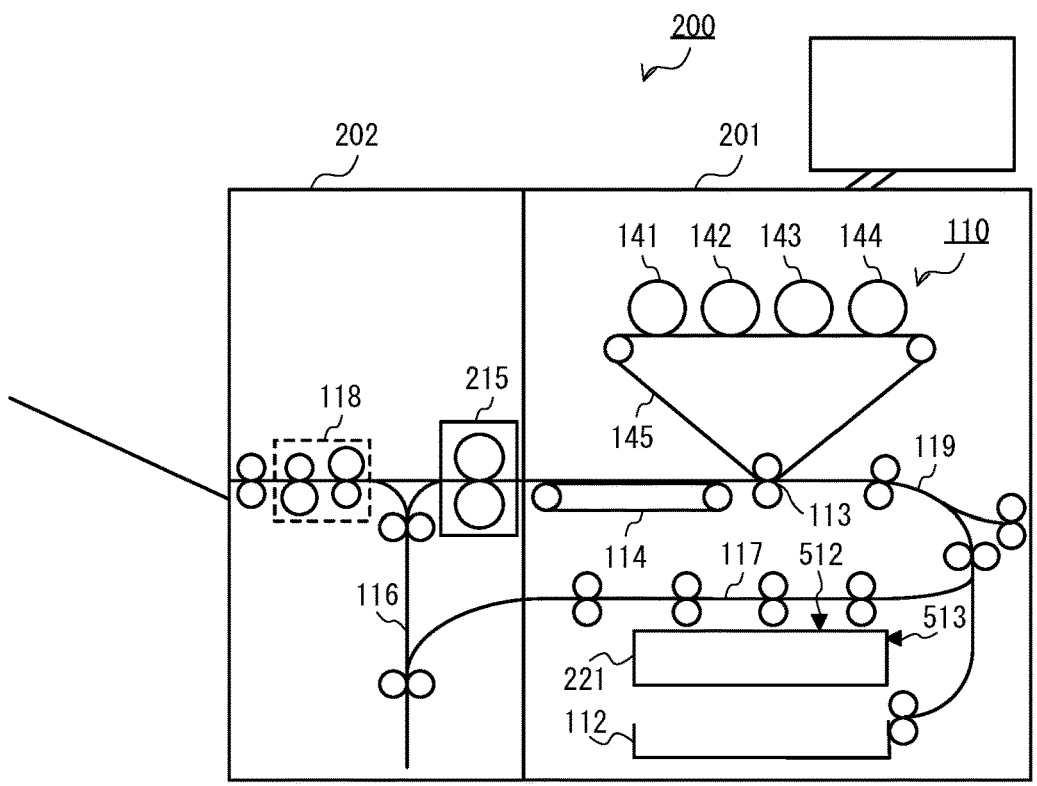
FIG. 2 is a configuration view of a second image forming apparatus.

For description of this embodiment, configurations of two image forming apparatus having different specifications are described. FIG. 1 is a configuration view of a first image forming apparatus of this embodiment. FIG. 2 is a configuration view of a second image forming apparatus of this embodiment, which is of a type different from that of the first image forming apparatus.

A first image forming apparatus 100 includes a printer 101 and a sheet delivery unit 102. The printer 101 is configured to form an image on a sheet. The sheet delivery unit 102 includes a curl correction unit 118 and a toner collection box 121. The curl correction unit 118 is configured to perform curl correction on the sheet having the image formed thereon by the printer 101. The toner collection box 121 is configured to collect developer such as toner that has not been transferred to the sheet in a case where the image is formed on the sheet.

A printing operation performed by the printer 101 is described.

The printer 101 forms a toner image with use of an image forming portion 110. The image forming portion 110 performs, for example, processes of charging, exposure, and development on photosensitive members 141, 142, 143, and 144 to form toner images on the photosensitive members 141, 142, 143, and 144. A plurality of photosensitive members 141, 142, 143, and 144 are provided, and toner images of different colors are formed on the photosensitive members 141, 142, 143, and 144, respectively. The toner images formed on the photosensitive members 141, 142, 143, and 144 are transferred to an intermediate transfer member 145 while being superimposed on one another. In such a manner, a full-color toner image is formed on the intermediate transfer member 145.

Further, in addition to such image forming portion 110, the printer 101 includes sheet-feeding cassettes 111 and 112, which are configured to accommodate sheets, a transfer portion 113, a conveyance belt 114, and a fixing device 115. A sheet on which an image is to be formed is fed from any one of the sheet-feeding cassette 111 and the sheet-feeding cassette 112 to the transfer portion 113 through a conveyance passage 119. At this time, the toner image having been formed on the intermediate transfer member 145 by the image forming portion 110 is also conveyed to the transfer portion 113. The transfer portion 113 transfers the toner image having been formed on the intermediate transfer member 145 to the sheet.

The sheet having the toner image transferred thereto is conveyed by the conveyance belt 114 from the transfer portion 113 to the fixing device 115. The fixing device 115 uses heat to fix the toner image having been transferred to the sheet. In such a manner, the image is formed on the sheet. In a case of simplex printing, a sheet having an image formed thereon is delivered to an outside of the apparatus after being subjected to the curl correction by the curl correction unit 118 provided inside the sheet delivery unit 102.

In a case of duplex printing, a sheet having an image formed on one surface thereof is conveyed to the conveyance passage 119 through a turn-over passage 116 and a duplex-printing passage 117. When the sheet passes through the turn-over passage 116 and the duplex-printing passage 117, a surface of the sheet on which an image is to be formed is turned over. The sheet having been conveyed to the conveyance passage 119 is subjected to image formation on another surface thereof by the transfer portion 113 and the fixing device 115. The sheet having the image formed on another surface thereof is subjected to the curl correction by the curl correction unit 118 provided inside the sheet delivery unit 102 and is delivered to the outside of the apparatus.

A sheet presence/absence sensor 501, a sheet-surface detection sensor 502, a sheet-feeding motor described later, a sheet-feeding sensor 504, and a sheet-feeding-cassette detection sensor 505 are provided to the sheet-feeding cassette 111 as loads. The sheet presence/absence sensor 501 is configured to detect the presence or absence of a sheet inside the sheet-feeding cassette 111. The sheet-surface detection sensor 502 is configured to detect an upper surface of the uppermost sheet among sheets stacked inside the sheet-feeding cassette 111. The sheet-feeding motor is rotatable in forward and backward directions and is configured to selectively switch and perform an operation of feeding sheets from the sheet-feeding cassette 111 and an operation of lifting up a placement surface on which the sheets provided inside the sheet-feeding cassette 111 are placed. The sheet-feeding sensor 504 is configured to detect a sheet having been fed. The sheet-feeding-cassette detection sensor 505 is configured to detect whether or not the sheet-feeding cassette 111 is set in the printer 101.

Figure 3:
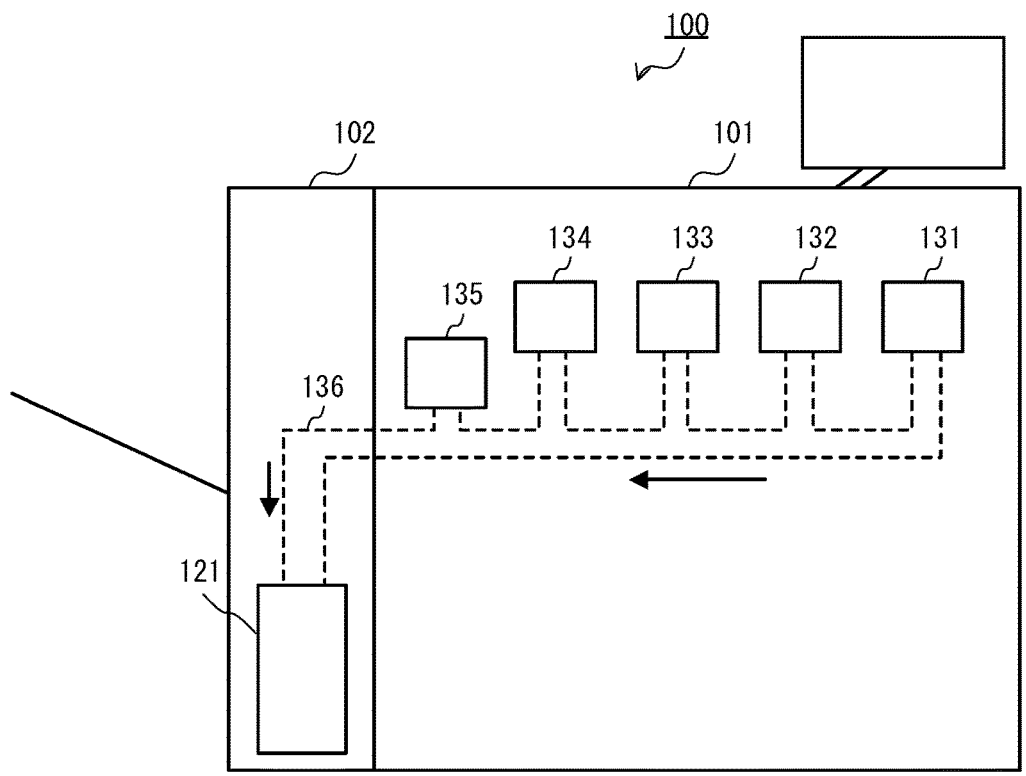
FIG. 3 is an explanatory view for illustrating toner collection.

Toner that remains on the photosensitive members 141, 142, 143, and 144 after the transfer to the intermediate transfer member 145 and toner that remains on the intermediate transfer member 145 after the transfer to the sheet are collected to the toner collection box 121. FIG. 3 is an explanatory view for illustrating toner collection. The printer 101 includes cleaning systems 131, 132, 133, 134, and 135 for the toner collection. The cleaning systems 131, 132, 133, and 134 are configured to remove the toner that remains on the photosensitive members 141, 142, 143, and 144. The cleaning system 135 is configured to remove the toner that remains on the intermediate transfer member 145. The toner having been removed by the cleaning systems 131, 132, 133, 134, and 135 is conveyed to the toner collection box 121 through a toner collection conveyance passage 136. In such a manner, the toner that remains after the transfer is collected.

A second image forming apparatus 200 includes a printer 201 and a sheet delivery unit 202. The second image forming apparatus 200 is configured so as to improve the number of images to be formed on sheets per unit time (productivity). In order to satisfy the high productivity, it is required that the fixing device have a large heat capacity. A fixing device having a large heat capacity has a large size. As a result, a space for arranging the fixing device inside the printer 201 cannot be secured.

Thus, in the second image forming apparatus 200, a fixing device 215 is arranged in the sheet delivery unit 202. With the fixing device 215 being arranged in the sheet delivery unit 202, a large number of components provided inside the printer 201 can be standardized with those provided inside the printer 101 of the first image forming apparatus 100.

Meanwhile, with the fixing device 215 being provided in the sheet delivery unit 202, unlike the first image forming apparatus 100, a space for providing a toner collection box cannot be secured in the sheet delivery unit 202. In a case where the toner collection box is arranged at a position far apart from the cleaning systems, a large space is required for securing the toner collection conveyance passage, which causes an increase in cost. Thus, in the second image forming apparatus 200, a toner collection box 221 is arranged in a space that corresponds to the space for arranging the sheet-feeding cassette 111 in the first image forming apparatus 100. That is, the toner collection box 221 is arranged in the printer 201. The sheet-feeding cassette 112 is arranged inside the printer 201 of the second image forming apparatus 200 similarly to the first image forming apparatus 100.

The second image forming apparatus 200 with high productivity has a small sheet-feeding capacity with the sheet-feeding cassette provided inside the apparatus. Thus, in general, such image forming apparatus is used with an external large-capacity sheet-feeding device connected thereto. Consequently, even when the toner collection box 221 is arranged in place of the sheet-feeding cassette 111, influence on the number of images to be successively formed on sheets per unit time is small.

The second image forming apparatus 200 is configured to perform image formation on a sheet similarly to the first image forming apparatus 100. That is, the second image forming apparatus 200 is configured to form a toner image with use of the image forming portion 110 and transfer the toner image to the sheet with use of the transfer portion 113. The sheet having the toner image transferred thereto is conveyed by the conveyance belt 114 to the fixing device 215, and the toner image is fixed on the sheet by the fixing device 215. Then, the sheet having the toner image fixed thereon is delivered to the outside of the apparatus.

Figure 4:
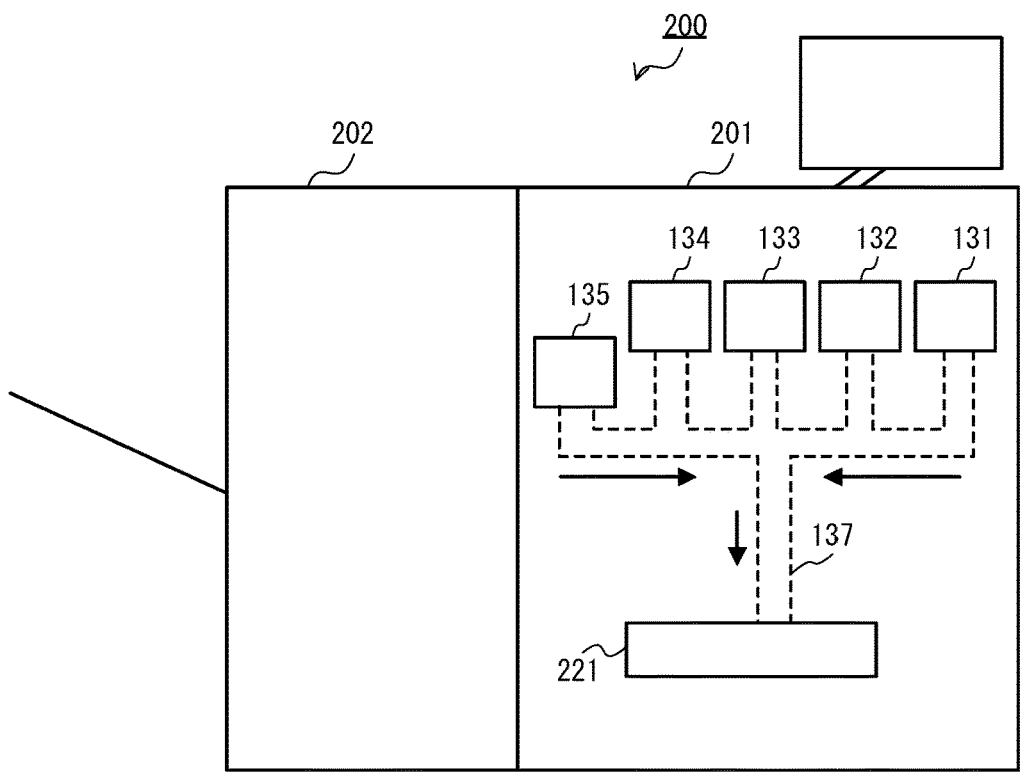
FIG. 4 is an explanatory view for illustrating toner collection.

Also in the second image forming apparatus 200, toner that remains on the photosensitive members 141, 142, 143, and 144 after the transfer to the intermediate transfer member 145 and toner that remains on the intermediate transfer member 145 after the transfer to the sheet are collected to the toner collection box 221. FIG. 4 is an explanatory view for illustrating toner collection by the second image forming apparatus 200. The cleaning systems 131, 132, 133, and 134 are configured to remove the toner that remains on the photosensitive members 141, 142, 143, and 144. The cleaning system 135 is configured to remove the toner that remains on the intermediate transfer member 145. The toner having been removed by the cleaning systems 131, 132, 133, 134, and 135 is conveyed to the toner collection box 221 through a toner collection conveyance passage 137 by a toner-collection conveyance motor described later.

A full-load detection sensor 512 and a toner-collection-box detection sensor 513 are provided to the toner collection box 221. The full-load detection sensor 512 is configured to detect whether or not the toner having been collected to the toner collection box 221 is fully loaded. The toner-collection-box detection sensor 513 is configured to detect whether or not the toner collection box 221 is set in the printer 201.

<Control Board>

Figure 5A:
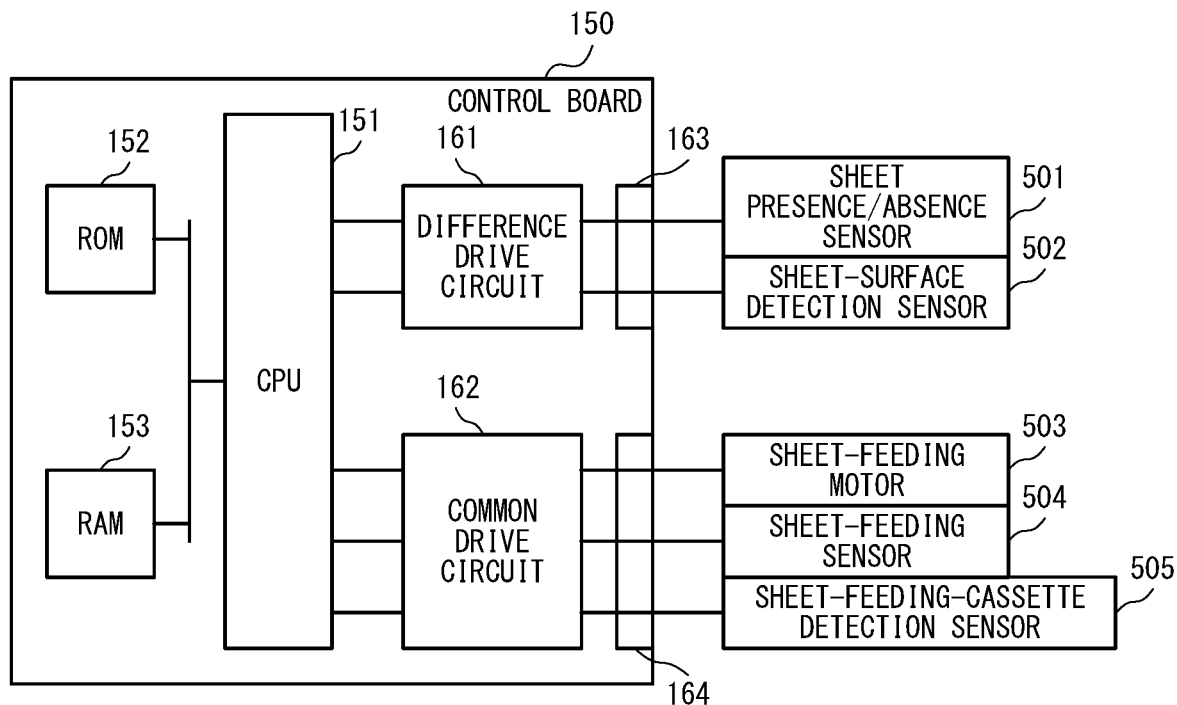
FIG. 5A and FIG. 5B are explanatory views for illustrating a control board.
Figure 5B:
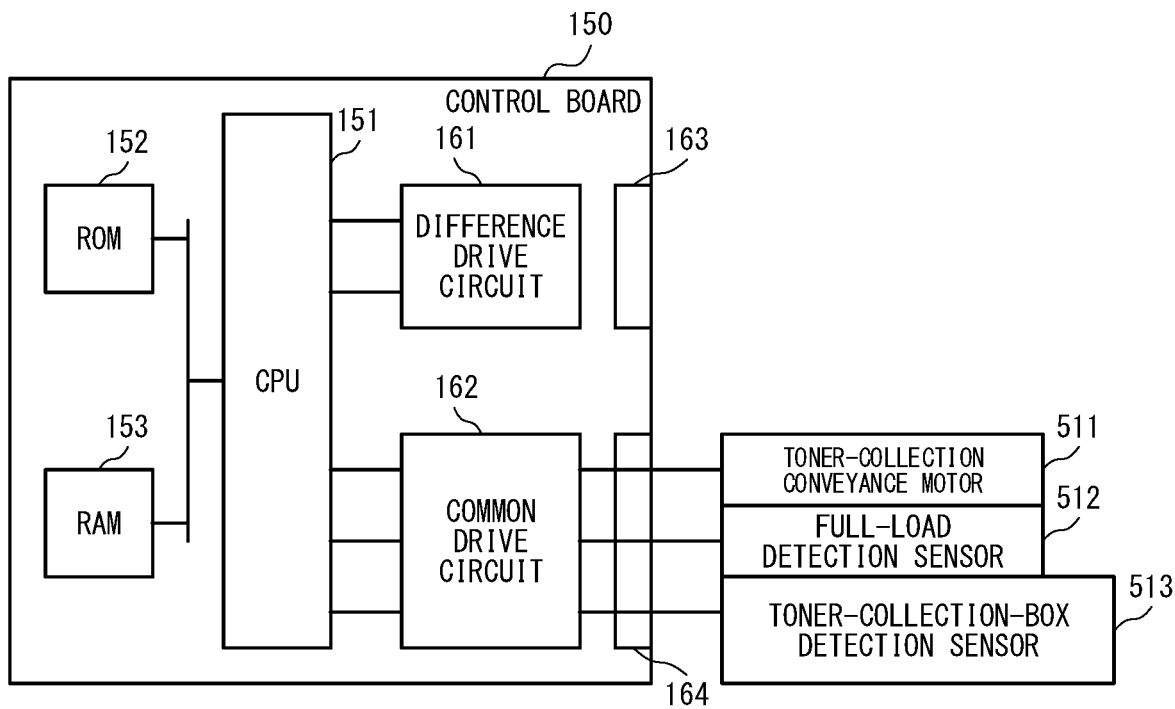

Next, a control board which is mountable to each of the first image forming apparatus 100 and the second image forming apparatus 200 is described. FIG. 5A and FIG. 5B are explanatory views for illustrating a control board 150 which can be used for each of the first image forming apparatus 100 and the second image forming apparatus 200. FIG. 5A is an explanatory view for illustrating the control board 150 in a case of being mounted to the first image forming apparatus 100. FIG. 5B is an explanatory view for illustrating the control board 150 in a case of being mounted to the second image forming apparatus 200.

The control board 150 includes a CPU 151, a read only memory (ROM) 152, and a random-access memory (RAM) 153. The CPU 151, the ROM 152, and the RAM 153 are communicably connected to one another through a bus line. The CPU 151 executes a control program stored in the ROM 152 while using the RAM 153 as a working area to control operations of the image forming apparatus (first image forming apparatus 100 or second image forming apparatus 200) to which the control board 150 is mounted.

The control board 150 includes a difference drive circuit 161 and a common drive circuit 162. Whether or not the difference drive circuit 161 is to be used for control depends on a type of the image forming apparatus. The difference drive circuit 161 of this embodiment is used for driving some loads of the sheet-feeding cassette 111 in a case where the control board 150 is mounted to the first image forming apparatus 100. The difference drive circuit 161 is not used for driving in a case where the control board 150 is mounted to the second image forming apparatus 200. The common drive circuit 162 is used for driving regardless of a type of the image forming apparatus but outputs a different setting signal depending on a type of the image forming apparatus to which the control board 150 is mounted. In a case where the control board 150 is mounted to the first image forming apparatus 100, the common drive circuit 162 of this embodiment is used for driving loads which are different from loads of the sheet-feeding cassette 111 driven by the difference drive circuit 161. In a case where the control board 150 is mounted to the second image forming apparatus 200, the common drive circuit 162 is used for driving loads of the toner collection box 221 and a toner collection conveyance portion configured to convey toner to the toner collection box 221.

The difference drive circuit 161 is connected to some loads of the sheet-feeding cassette 111 of the first image forming apparatus 100 through a connector 163. In this embodiment, the difference drive circuit 161 is connected to the sheet presence/absence sensor 501 and the sheet-surface detection sensor 502 through the connector 163. The common drive circuit 162 is connected to a common connector 164. In a case where the control board 150 is mounted to the first image forming apparatus 100, the common drive circuit 162 is connected to the sheet-feeding motor 503, the sheet-feeding sensor 504, and the sheet-feeding-cassette detection sensor 505, which are mentioned above, through the common connector 164. In a case where the control board 150 is mounted to the second image forming apparatus 200, the common drive circuit 162 is connected to the toner-collection conveyance motor 511, the full-load detection sensor 512, and the toner-collection-box detection sensor 513, which are mentioned above, through the common connector 164.

Figure 6:
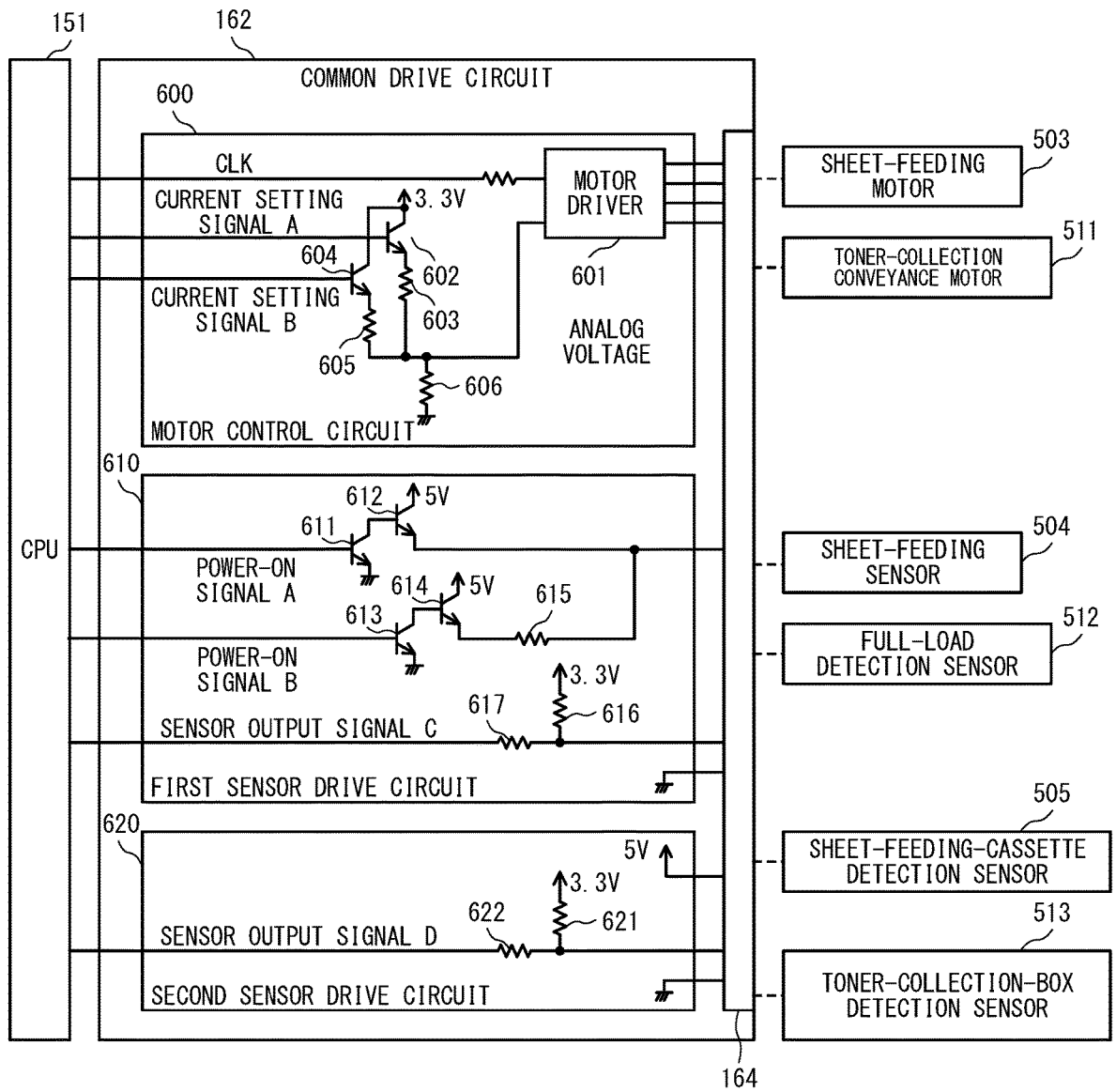
FIG. 6 is a detailed explanatory view for illustrating a common drive circuit.

As in the case of the sheet-feeding cassette 111 of the first image forming apparatus 100 and the toner collection box and the toner collection conveyance portion of the second image forming apparatus 200, loads of the parts which are replaced in function depending on an apparatus are controlled with use of the common drive circuit 162, thereby being capable of achieving space saving of the control board 150. FIG. 6 is a detailed explanatory view for illustrating the common drive circuit 162.

The common drive circuit 162 includes a motor control circuit 600, a first sensor drive circuit 610, and a second sensor drive circuit 620.

In a case where the control board 150 is mounted to the first image forming apparatus 100, the sheet-feeding motor 503 is connected to the motor control circuit 600. The sheet-feeding sensor 504 is connected to the first sensor drive circuit 610. The sheet-feeding-cassette detection sensor 505 is connected to the second sensor drive circuit 620.

In a case where the control board 150 is mounted to the second image forming apparatus 200, the toner-collection conveyance motor 511 is connected to the motor control circuit 600. The full-load detection sensor 512 is connected to the first sensor drive circuit 610. The toner-collection-box detection sensor 513 is connected to the second sensor drive circuit 620.

Motor Control Circuit

The motor control circuit 600 is configured to transmit a pulse signal as a drive signal to the sheet-feeding motor 503 (in a case where the control board 150 is mounted to the first image forming apparatus) or to the toner-collection conveyance motor 511 (in a case where the control board 150 is mounted to the second image forming apparatus). The sheet-feeding motor 503 and the toner-collection conveyance motor 511 are motors of the same type. The sheet-feeding motor 503 and the toner-collection conveyance motor 511 of this embodiment are each a stepping motor configured to operate in a step-by-step manner in accordance with a pulse signal acquired from the motor control circuit 600.

The motor control circuit 600 includes a motor driver 601. The motor driver 601 generates a pulse signal based on a clock signal CLK input from the CPU 151 and transmits the generated pulse signal to the load that is connected (sheet-feeding motor 503 or toner-collection conveyance motor 511).

In order to set a current value of a current that is to be supplied to the load, analog voltage is input to the motor driver 601. In this embodiment, the analog voltage is generated through resistor division. The motor control circuit 600 includes, as a voltage generation circuit, transistors 602 and 604 and resistors 603, 605, and 606. The transistor 602 receives a current setting signal A input from the CPU 151. The transistor 604 receives a current setting signal B input from the CPU 151. The voltage generation circuit generates an analog voltage according to the current setting signals A and B.

In a case where control is performed such that conduction of the transistor 602 is established with the current setting signal A, analog voltage divided by the resistor 603 and the resistor 606 is input to the motor driver 601. In a case where control is performed such that conduction of the transistor 604 is established with the current setting signal B, analog voltage divided by the resistor 605 and the resistor 606 is input to the motor driver 601. Such configuration that the analog voltage that is input to the motor driver 601 is switchable enables supply of a current having an appropriate different current value that is adaptable to a load connected to the motor control circuit 600.

In this embodiment, a resistance value of the resistor 603 is set to be smaller than a resistance value of the resistor 605. The motor driver 601 outputs a larger current as a voltage value of the input analog voltage is larger. Thus, in this embodiment, a current having a larger current value flows through the motor driver 601 in a case in which the current setting signal A is active as compared to a case in which the current setting signal B is active. A load (sheet) of the sheet-feeding motor 503 is larger than a load (toner) of the toner-collection conveyance motor 511. Thus, the current setting signal A is set to be active in a case where the sheet-feeding motor 503 is driven, and the current setting signal B is set to be active in a case where the toner-collection conveyance motor 511 is driven. With the current value of the supplied current being optimally set for the sheet-feeding motor 503 and the toner-collection conveyance motor 511 in such a manner, the sheet-feeding motor 503 and the toner-collection conveyance motor 511 can convey the load (sheet or toner) with an optimum drive force.

In this embodiment, the voltage value of the analog voltage supplied to the motor driver 601 is set by switching a resistor voltage division ratio with the current setting signals A and B. However, the voltage value of the analog voltage may be set according to a signal output from the CPU 151. For example, the voltage value of the analog voltage may be set according to a pulse width modulation (PWM) signal output from the CPU 151. In this case, for example, the PWM signal is smoothened with an RC filter, and the smoothened PWM signal is input as the analog voltage to the motor driver 601. The voltage value of the analog voltage is changed by changing a duty ratio of the PWM signal.

First Sensor Drive Circuit

The first sensor drive circuit 610 applies the power-supply voltage of 5 V to a sensor that is connected (sheet-feeding sensor 504 or full-load detection sensor 512). The sensor (sheet-feeding sensor 504 or full-load detection sensor 512) operates upon the application of the power-supply voltage.

The sheet-feeding sensor 504 is a reflection type sensor including a light emitter and a light receiver. The light emitter of the sheet-feeding sensor 504 emits light in a case where the power-supply voltage is applied. When the sheet arrives at a detection position of the sheet-feeding sensor 504, the light emitted from the light emitter is reflected on the sheet and received by the light receiver. The sheet-feeding sensor 504 can detect the presence or absence of the sheet based on a result of reception of light by the light receiver.

The full-load detection sensor 512 is a transmission type sensor including a light emitter and a light receiver. The light emitter of the full-load detection sensor 512 emits light in a pulsed manner. When the toner collected to the toner collection box 221 accumulates to a height corresponding to a predetermined amount to block an optical path so that the light receiver cannot receive the light from the light emitter, the full-load detection sensor 512 detects that the toner has been fully loaded to the toner collection box 221.

The first sensor drive circuit 610 includes, as a voltage output circuit, transistors 611 and 612 on a line for inputting a power-on signal A from the CPU 151. The first sensor drive circuit 610 includes, as a voltage output circuit, transistors 613 and 614 and a resistor 615 on a line for inputting a power-on signal B from the CPU 151. The first sensor drive circuit 610 includes resistors 616 and 617 on a line for transmitting a sensor output signal C to the CPU 151.

In a case where the sheet-feeding sensor 504 is connected, conduction of the transistors 611 and 612 of the first sensor drive circuit 610 is established with the power-on signal A input from the CPU 151 being active. The voltage of 5 V is supplied to a collector terminal of the transistor 612. Thus, through the conduction of the transistor 612, the first sensor drive circuit 610 can apply the power-supply voltage of 5 V to the sheet-feeding sensor 504. The power-on signal A is always active during operation of the first image forming apparatus 100. Thus, the first sensor drive circuit 610 always outputs the power-supply voltage to always apply the power-supply voltage to the sheet-feeding sensor 504.

In a case where the full-load detection sensor 512 is connected, conduction of the transistors 613 and 614 of the first sensor drive circuit 610 is established with the power-on signal B input from the CPU 151 being active. It is required that the full-load detection sensor 512 emit light in a pulsed manner. Thus, the power-on signal B is repeatedly turned on and off in a predetermined cycle. With this, the transistors 613 and 614 repeat conduction and interruption in the predetermined cycle to output the power-supply voltage in the predetermined cycle. Thus, the power-supply voltage of 5 V is applied to the full-load detection sensor 512 via the resistor 615 in the predetermined cycle. The resistor 615 is provided to restrict a current that flows through the full-load detection sensor 512. The full-load detection sensor 512 allows the light emitter provided inside the sensor to emit light in a pulsed manner with the current flowing therethrough.

Detection results of the sheet-feeding sensor 504 and the full-load detection sensor 512 are transmitted to the CPU 151 via the first sensor drive circuit 610. The CPU 151 acquires the detection results of the sensors with the sensor output signal C. Each sensor (sheet-feeding sensor 504 and full-load detection sensor 512) has an output portion formed of an open collector circuit. In a case where the light receiver of the sensor detects light, the collector circuit is turned on, and a current flows through the resistor 616 being a pull-up resistor. As a result, the sensor output signal C is brought to a low level. In a case where the light receiver of the sensor does not detect light, the collector circuit is turned off, and a current does not flow through the resistor 616 being a pull-up resistor. As a result, the sensor output signal C is brought to a high level.

Second Sensor Drive Circuit

The sheet-feeding-cassette detection sensor 505 and the toner-collection-box detection sensor 513 which are connectable to the second sensor drive circuit 620 are sensors of the same type. Thus, the second sensor drive circuit 620 operates in the same manner when any one of the sensors is connected. The sheet-feeding-cassette detection sensor 505 and the toner-collection-box detection sensor 513 are each a general transmission type sensor. The second sensor drive circuit 620 always applies the power-supply voltage of 5 V to the sensor that is connected (any of sheet-feeding-cassette detection sensor 505 and toner-collection-box detection sensor 513).

The second sensor drive circuit 620 includes resistors 621 and 622 on a line for transmitting a sensor output signal D to the CPU 151. Output portions of the sheet-feeding-cassette detection sensor 505 and the toner-collection-box detection sensor 513 are each formed of an open collector circuit similarly to the output portions of the sheet-feeding sensor 504 and the full-load detection sensor 512. Detection results of the sheet-feeding-cassette detection sensor 505 and the toner-collection-box detection sensor 513 are transmitted to the CPU 151 similarly to those of the sheet-feeding sensor 504 and the full-load detection sensor 512.

<Apparatus Distinguishing Processing>

Figure 7:
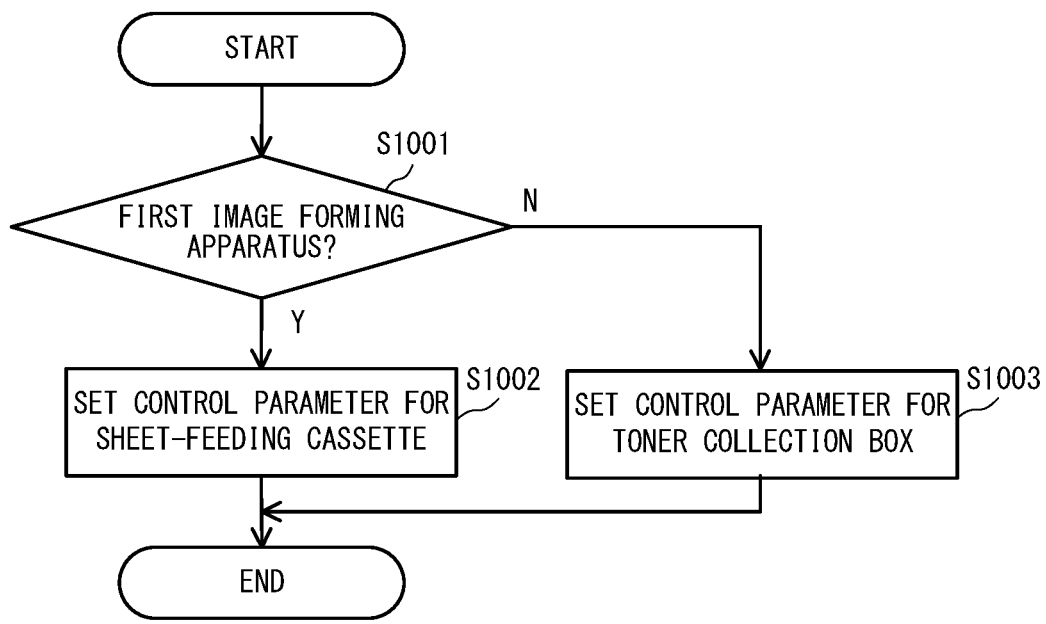
FIG. 7 is a flowchart for illustrating apparatus distinguishing processing.

The control board 150 is configured to perform distinguishing processing for an image forming apparatus to which the control board 150 is mounted at the time of activation. FIG. 7 is a flowchart for illustrating apparatus distinguishing processing. In a case where the power of the image forming apparatus is turned on, the CPU 151 of the control board 150 reads a computer program stored in advance in the ROM 152 to perform processing of distinguishing the image forming apparatus to which the control board 150 is mounted. The processing of distinguishing the image forming apparatus may be performed by another method. For example, the CPU 151 may acquire configuration information of a system from a control device configured to control an entire system including the image forming apparatus, to thereby perform the apparatus distinguishing processing.

The CPU 151 distinguishes whether or not the apparatus to which the control board 150 is mounted is the first image forming apparatus 100 (Step S1001). In a case where the apparatus is the first image forming apparatus 100 (Step S1001: Y), the CPU 151 determines that the load that is connected is the sheet-feeding cassette 111. In this case, the CPU 151 sets a control parameter for controlling operations of the sheet-feeding cassette 111 (Step S1002). Specifically, the CPU 151 brings the operation of the difference drive circuit 161 into an active state, and inputs the current setting signal A and the power-on signal A to the common drive circuit 162. After setting the control parameter, the CPU 151 terminates the apparatus distinguishing processing.

In a case where the apparatus is not the first image forming apparatus 100 (Step S1001: N), the CPU 151 determines that the load that is connected is the toner collection box 221 and the toner collection conveyance portion of the second image forming apparatus 200. In this case, the CPU 151 sets a control parameter for controlling operations of the toner collection box 221 and the toner collection conveyance portion (Step S1003). Specifically, the CPU 151 inputs the current setting signal B and the power-on signal B to the common drive circuit 162. After setting the control parameter, the CPU 151 terminates the apparatus distinguishing processing.

The control board 150 is capable of controlling, with use of the common drive circuit 162, the loads of the first image forming apparatus 100 and the second image forming apparatus 200 having different functions. Thus, it is not required that components which are adaptable to functions of loads of every apparatus be mounted to the control board 150, thereby suppressing an increase in size. As described above, in a case where a control board that is common to image forming apparatus of different types is used, an increase in size of the control board 150 which is capable of driving loads having different functions for every apparatus can be suppressed.

Modification Example

Figure 8:
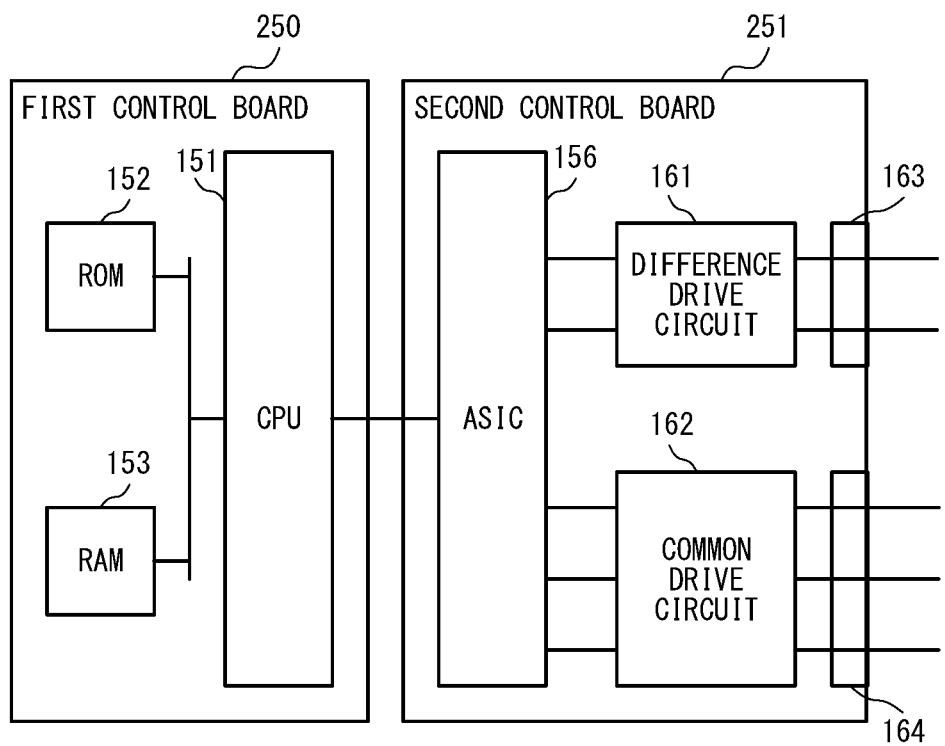
FIG. 8 is an explanatory view for illustrating a modification example of the control board.

FIG. 8 is an explanatory view for illustrating a modification example of the control board. This control board is mountable to each of the first image forming apparatus 100 and the second image forming apparatus 200. In this example, the control board includes a first control board 250 and a second control board 251.

The first control board 250 includes the CPU 151, the ROM 152, and the RAM 153. Configurations and operations of the CPU 151, the ROM 152, and the RAM 153 are the same as those of the CPU 151, the ROM 152, and the RAM 153 of FIG. 5A and FIG. 5B. The second control board 251 includes an application specific integrated circuit (ASIC) 156, the difference drive circuit 161, and the common drive circuit 162. Configurations and operations of the difference drive circuit 161 and the common drive circuit 162 are the same as those of the difference drive circuit 161 and the common drive circuit 162 of FIG. 5A, FIG. 5B, and FIG. 6.

The ASIC 156 is connected to the CPU 151 in such a manner as to enable serial communication. The ASIC 156 is a dedicated control circuit configured to control the difference drive circuit 161 and the common drive circuit 162. The ASIC 156 controls operations of the loads with use of the difference drive circuit 161 and the common drive circuit 162 in accordance with an instruction from the CPU 151. In accordance with identification information of the image forming apparatus given by the CPU 151, the ASIC 156 transmits the current setting signal A or B to the motor control circuit 600 of the common drive circuit 162 and transmits the power-on signal A or B to the first sensor drive circuit 610. Further, the ASIC 156 acquires the sensor output signal C from the first sensor drive circuit 610 of the common drive circuit 162, and acquires the sensor output signal D from the second sensor drive circuit 620. The ASIC 156 transmits the acquired sensor output signals C and D to the CPU 151. In such a manner, the CPU 151 controls drive of the load via the ASIC 156. The apparatus distinguishing processing is performed by the CPU 151 in the manner as illustrated in FIG. 7. The CPU 151 transmits a signal to the common drive circuit 162 based on the control parameter having been set through the apparatus distinguishing processing.

The control boards 250 and 251 are capable of controlling, with use of the common drive circuit 162, the loads of the first image forming apparatus 100 and the second image forming apparatus 200 having different functions. Thus, it is not required that components which are adaptable to functions of loads of every apparatus be mounted to the control boards 250 and 251, thereby suppressing an increase in size. As described above, in a case where the control boards 250 and 251 that are common to image forming apparatus of different types are used, an increase in the size of the control boards 250 and 251 which are capable of driving loads having different functions for every apparatus can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-038700, filed Mar. 6, 2020, which is hereby incorporated by reference herein in its entirety.

What is claimed is:

1. A control board configured to be mountable to a first image forming apparatus and to a second image forming apparatus of a type different from a type of the first image forming apparatus, the first image forming apparatus including a first load, the second image forming apparatus including a second load having a function different from a function of the first load, the control board comprising:
   a common connector to which the first load is to be connected in a case where the control board is mounted to the first image forming apparatus, and to which the second load is to be connected in a case where the control board is mounted to the second image forming apparatus;
   a common drive circuit configured to drive the first load via the common connector in a case where the control board is mounted to the first image forming apparatus, and configured to drive the second load via the common connector in a case where the control board is mounted to the second image forming apparatus; and
   at least one processor configured to:
      acquire configuration information related to an image forming apparatus to which the control board is mounted;
      control the common drive circuit to drive the first load based on the configuration information in a case where the control board is mounted to the first image forming apparatus; and
      control the common drive circuit to drive the second load based on the configuration information in a case where the control board is mounted to the second image forming apparatus.

2. The control board according to claim 1, wherein the control board includes a first control board and a second control board,
   wherein the at least one processor includes a first processor and a second processor,
   wherein the first control board includes the first processor,
   wherein the second control board includes the second processor, the common drive circuit, and the common connector, and
   wherein the second processor controls the common drive circuit based on the configuration information.

3. The control board according to claim 1, wherein the common drive circuit is configured to supply current having a first current value for the first load and configured to supply current having a second current value, different from the first current value, for the second load.

4. The control board according to claim 3, wherein the common drive circuit includes:
   a driver configured to drive a load; and
   a voltage generation circuit configured to apply analog voltage having a different voltage value to the driver,
   wherein the voltage generation circuit is configured to generate the analog voltage having a voltage value set in accordance with an instruction from the processor, and
   wherein the driver is configured to supply a current having a current value set according to the voltage value of the analog voltage generated by the voltage generation circuit to the load that is connected.

5. The control board according to claim 4, wherein the first load and the second load are each a motor, and
   wherein the driver is configured to acquire a clock signal from the processor and generate a pulse signal based on the clock signal to operate the connected load based on the pulse signal.

6. The control board according to claim 1, wherein the common drive circuit is configured to always apply voltage in a case where the first load is connected, and is configured to apply voltage in a predetermined cycle in a case where the second load is connected.

7. The control board according to claim 6, wherein the common drive circuit includes:
   a first voltage output circuit configured to always output voltage in accordance with an instruction from the processor; and
   a second voltage output circuit configured to output voltage in a predetermined cycle in accordance with an instruction from the processor.

8. The control board according to claim 6, wherein the first load and the second load are each a sensor having an open collector at an output portion,
   wherein the common drive circuit includes a pull-up resistor, and
   wherein the processor is configured to acquire a detection result of the sensor via the common drive circuit.

9. The control board according to claim 1, further comprising a circuit which is configured to drive a third load that is different from the first load in a case where the control board is mounted to the first image forming apparatus, and is not to be used for driving in a case where the control board is mounted to the second image forming apparatus.

* * * * *